United States Patent [19]

Watanabe

[11] Patent Number: 5,020,485

[45] Date of Patent: Jun. 4, 1991

[54] TWO-CYCLE ENGINE

[75] Inventor: Hideo Watanabe, Tokyo, Japan

[73] Assignee: Fuji Jukogyo Kabushiki Kaisha, Tokyo, Japan

[21] Appl. No.: 488,354

[22] Filed: Mar. 2, 1990

[30] Foreign Application Priority Data

Mar. 27, 1989 [JP] Japan .................................. 1-34540

[51] Int. Cl.⁵ ............................................ F02B 33/04
[52] U.S. Cl. ................................ 123/73 C; 123/193 P
[58] Field of Search .......... 123/193 P, 193 CH, 73 C, 123/73 PP, 65 BA, 65 W, 65 R

[56] References Cited

U.S. PATENT DOCUMENTS

| | | | |
|---|---|---|---|
| 2,246,019 | 6/1941 | Steinlein | 123/73 C |
| 2,329,885 | 9/1943 | DuFow | 123/65 A |
| 4,549,508 | 10/1985 | Fujimoto | 123/73 PP |
| 4,794,901 | 1/1989 | Hong et al. | 123/73 C |
| 4,821,687 | 4/1989 | Iwai | 123/73 PP |
| 4,899,698 | 2/1990 | Thery | 123/65 A |
| 4,920,932 | 5/1990 | Schlunke | 123/73 C |
| 4,932,370 | 6/1990 | Schierling et al. | 123/73 C |

FOREIGN PATENT DOCUMENTS

| | | | |
|---|---|---|---|
| 564264 | 10/1958 | Canada | 123/73 C |
| 510959 | 1/1955 | Italy | 123/73 C |
| 0057430 | 5/1977 | Japan | 123/73 C |
| 0061606 | 5/1977 | Japan | 123/73 C |
| 62-32214 | 2/1987 | Japan . | |

Primary Examiner—David A. Okonsky
Attorney, Agent, or Firm—Martin A. Farber

[57] ABSTRACT

A two-cycle engine having a fuel injector provided for injecting fuel directly in a combustion chamber. An offset cavity having a hemispherical shape in vertical section is formed at a top of the combustion chamber, and a spark plug is located at a top portion of the cavity. A fuel injector is located to inject fuel in the opposite direction to the discharge direction from an exhaust port. A recess is formed in a crown of a piston corresponding to the cavity and the fuel injector.

3 Claims, 3 Drawing Sheets

TWO-CYCLE ENGINE

BACKGROUND OF THE INVENTION

The present invention relates to a two-cycle engine with a direct fuel injection system, and more particularly to a combustion chamber of the engine for promoting a stratified charge.

In a two-cycle engine, a cycle is completed with one rotation of the crankshaft so that air cannot be induced by itself. As the simplest method of producing scavenge air, a crankcase scavenging system is used.

In an ordinary crankcase scavenging two-stroke engine, vacuum is produced in an enclosed crankcase of the engine to pump fresh air into the crankcase when a piston ascends. When the piston descends, burned gas is discharged through an exhaust port while the fresh air in the crankcase is induced into a cylinder, thereby scavenging the cylinder. However, since the intake air quantity is small at a light engine load, the scavenging becomes insufficient, resulting in misfiring and hence in an irregular engine operation. In addition, a torque characteristic corresponding to the engine operating conditions becomes unstable. The oil consumption increases and a part of the fuel escapes from the cylinder, thereby resulting in an increase in the fuel consumption and toxic exhaust gas. Moreover, vacuum in the crankcase is insufficient for scavenging at a heavy engine load.

In order to resolve such problems, a two-stroke engine with a separate scavenge pump is used. The scavenge pump is driven to generate a scavenge pressure thereby delivering a sufficient amount of the fresh air into the cylinder. The engine is further provided with a direct fuel injection system so as to prevent the fuel from escaping through the exhaust port.

However, particularly in a low engine load range, a large amount of the burned gas remains in the combustion chamber of the engine to dilute the fuel and the scavenge air therein so that the combustible mixture is not perfectly burned. As a rich mixture of the fuel and the fresh air is directed toward a spark plug, a stratified charge increases combustion efficiency.

Japanese Patent Application Laid-Open 62-32214 discloses such a two-cycle engine. The two-cycle engine has a hemispheric cavity formed at a top of the combustion chamber, so that the cavity promotes turbulence of the fresh air in the vertical direction. The injected fuel is mixed with the turbulent air, and the mixture comes near the spark plug.

However, since a piston crown of the engine is flat, turbulent air flow is splashed by the piston crown so that the turbulence is attenuated. In addition, a part of the fuel injected from the injector is mixed with the remaining burned gas instead of the fresh air. Therefore, high combustion efficiency can not be expected.

SUMMARY OF THE INVENTION

The object of the present invention is to provide a two-cycle engine in which fuel is preferably burned at high efficiency by a stratified charge.

According to the present invention, there is provided a two-cycle engine having at least one cylinder, which has a piston, a combustion chamber, a scavenge port, an exhaust port, a fuel injector provided for injecting fuel directly in the combustion chamber and a spark plug.

The engine is characterized in that a top of the combustion chamber has an offset cavity having a hemispherical shape viewed vertically, and being located opposite to the exhaust port, the spark plug is located at a top of the cavity, the fuel injector is located to inject the fuel in the opposite direction to the discharge direction of the exhaust port, the full injector is installed at a predetermined angle with respect to the crown of the piston, the crown of the piston has a recess corresponding to the cavity and the fuel injector, and the recess has a bottom wall having substantially the same inclination angle as the fuel injector.

These and other objects and features of this invention will become understood from the following description with reference to the accompanying drawings.

DETAILED DESCRIPTION OF THE PREFERRED EMBODIMENT

Figure 1:
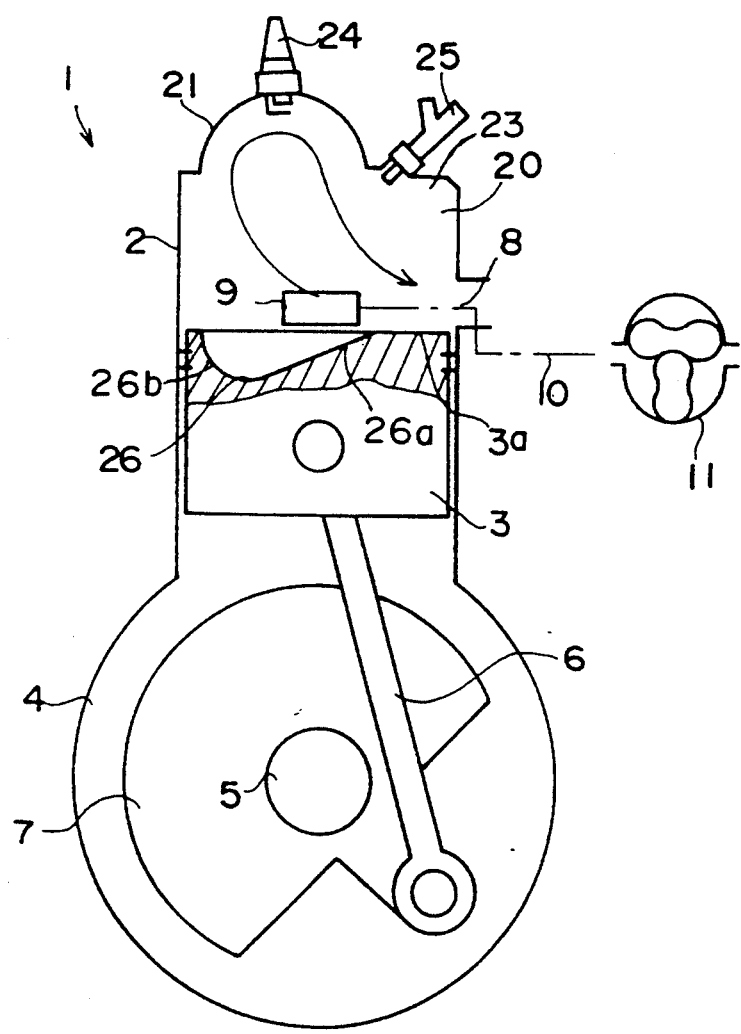
FIG. 1 is a schematic diagram of a two-cycle engine of the present invention.
Figure 2:
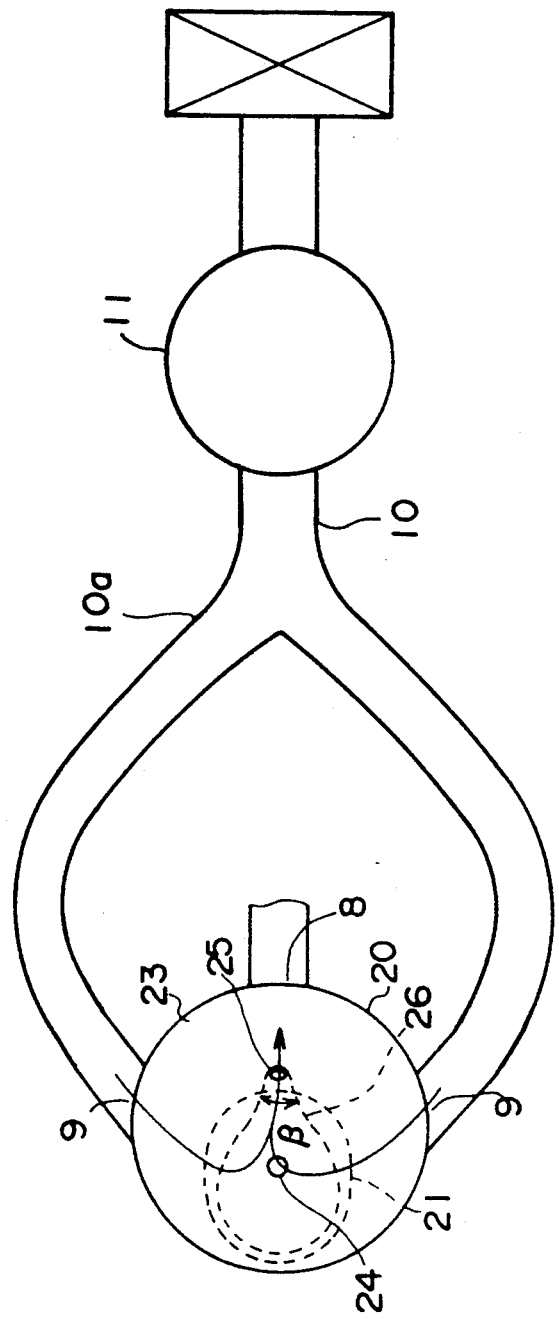
FIG. 2 is a plan view of the engine.

Referring to FIGS. 1 and 2, a two-cycle engine 1 comprises a cylinder 2, a piston 3 provided in the cylinder 2, a connecting rod 6 connected with the piston 3 and a crankshaft 5 disposed in a crankcase 4. A counterweight 7 is mounted on the crankshaft 5 so as to reduce inertia of the piston 3 reciprocating in the cylinder 2.

In a wall of the cylinder 2, an exhaust port 8 is formed and a scavenge ports 9 are formed at a lower position than that of the exhaust port 8, and the scavenge port 9 is angularly spaced from the exhaust port 8. The scavenge ports 9 are connected to branches 10a of an intake pipe 10 and communicated with a scavenge pump 11 provided in the intake pipe 10. The ports 8 and 9 open at a predetermined timing interval with respect to the position of the piston 3.

A top of a combustion chamber 20 in a cylinder head of the cylinder 2 has a hemispheric offset cavity 21 which is eccentric from the center line of the cylinder in an opposite direction of the exhaust port 8. The top of the cavity 21 is flat so as to form a squish zone 23 between the piston 3 and the top. A spark plug 24 is provided on the top of the cavity 21 and a fuel injector 25 is provided on a flat portion of the top adjacent to the center of the cylinder 2 as shown in FIG. 2. As shown in FIG. 3c, the fuel injector 25 is inclined so as to inject fuel in the opposite direction to the discharge direction of the exhaust port 8, making an angle with a crown 3a of the piston 3. The injector 25 is adapted to inject a predetermined amount of fuel in accordance with the operating conditions after the exhaust port 8 is closed by the piston 3.

On the other hand, a hemispheric recess 26 is formed in the piston crown 3a at a position opposing the cavity 21. In vertical section, a center side bottom 26a of the recess 26 has substantially the same inclination (180- α) as the injector 25, starting from a position opposing the injector 25 to a position under the top of the cavity 21, the depth at which is a predetermined depth H (FIG. 3c). The outer side bottom 26b is steeply inclined while forming a curve.

In a plan view shown in FIG. 2, the recess 26 has a circular periphery adjacent to the periphery of the piston 2 to form the hemispherical bottom 26b and a sector-shaped portion adjacent to the injector 25, the two portions smoothly connected with each other. The sector-shaped portion has an included angle $\beta$ which is slightly larger than an angle of the fuel spray from the injector 25. Thus, the fuel is injected into the recess 26 from the injector 25 without splashing.

The operation of the two-cycle engine is described hereinafter with reference to FIGS. 3a to 3c.

Figures 3A, 3B:
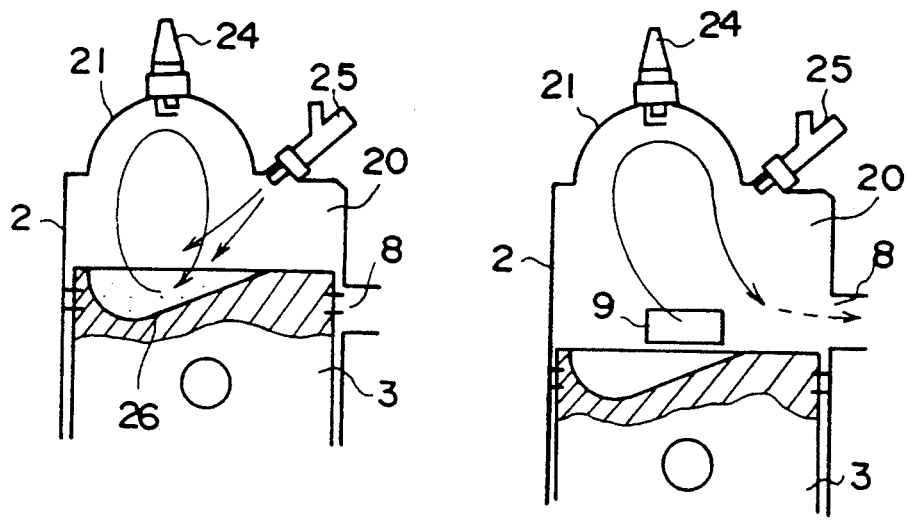
FIGS. 3a to 3c are schematic diagrams explaining the operation of the engine.
Figure 3C:
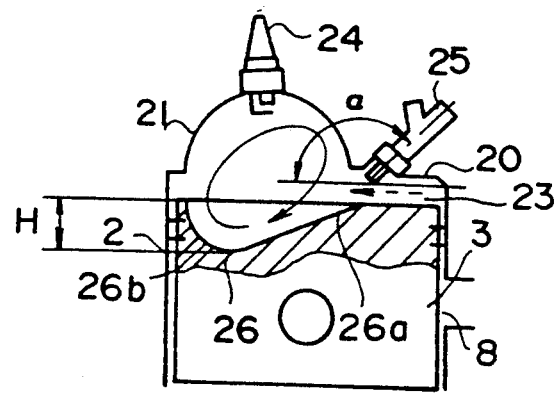

As shown in FIG. 3a, when the piston 3 descends to open the exhaust port 8, a part of the burned gases is discharged from the exhaust port. When the scavenge ports 9 open, pressurized scavenge air is delivered by the scavenge pump 11 into the cylinder 2 through the scavenge ports 9 in opposite directions. The scavenge air is upwardly turned by the wall of the cylinder and inverted by the wall of the cavity 21 to form a vertical swirl. Consequently, the burned gases in the cylinder 2 are scavenged so that fresh intake air is admitted therein with vertical swirling.

During the upward stroke, the piston 3 rises, closing both ports 8 and 9. The intake air which is trapped in the cavity 21 and the recess 26 continues to smoothly swirl in the vertical direction along the curved walls of the recesses with little attenuation. A small amount of fuel is injected from the injector 25 after the exhaust port 8 closes as shown in FIG. 3b. Since the center side bottom 26a of the recess 26 is inclined in the same direction as the injection direction of the fuel injector 25, the fuel is smoothly injected in the recess without splashing so as to be effectively mixed with the circulating fresh air, thereby forming an air-fuel mixture.

As the piston 3 ascends to the top dead center, the mixture is compressed to form a squish flow from the peripheries of the recess 26 and cavity 21 toward the center of the combustion chamber so that the swirling mixture is concentrated at the summit of the cavity 21 and the trubulence is promoted. Since the fuel mixture is charged in an upper portion of the cavity 21 and the burned gases stay below the mixture, the charge stratification is achieved. Thus, the fuel directly under the spark plug 24 is perfectly ignited.

The fuel injector may be of a type where a predetermined amount of fuel is injected together with air by compressed air in the form of an air-fuel mixture so that the fuel is finely atomized. The present invention may also be applied to other types of two-cycle engines such as a crank-case scavenged engine.

From the foregoing, it will be understood that the present invention provides a two-cycle engine where the circulation of scavenge air is maintained in the combustion chamber to provide a charge stratification. Since fuel is mixed with air in a recess formed on a piston crown, waste of fuel is prevented, thereby enhancing combustion efficiency in a low load range. The spark plug is disposed on a top portion of a cavity of a combustion chamber so that ignition efficiency is improved.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A two-cycle engine having at least one cylinder, a piston reciprocating in the cylinder, a combustion chamber defined in the cylinder, a scavenge port and an exhaust port formed on a wall of the cylinder, a fuel injector provided in the combustion chamber for injecting fuel directly therein, and a spark plug provided in the cylinder, wherein:

a top of the combustion chamber has an offset cavity with a hemispherical shape in vertical section, and being located opposite to the exhaust port;

the spark plug is located at a top portion of the cavity;

the fuel injector is inserted in the cylinder at an angle to a plane passing through the longitudinal central axis of the cylinder and at a predetermined angle with respect to a crown of the piston to inject the fuel in the opposite direction to the discharge direction of the exhaust port; and the crown of the piston has a recess corresponding to the cavity and the fuel injector, and the recess has a bottom wall with substantially the same inclination angle with respect to said plane as that of the fuel injector.

2. The two-stroke engine according to claim 1, wherein
   the recess is of a hemispherical shape in vertical section.

3. The two-stroke engine according to claim 1, wherein
   the scavenge port is divided into two ports oppositely disposed to each other and angularly spaced from the exhaust port.

* * * * *